US006118063A

United States Patent [19]

Steinbuhler

[11] Patent Number: 6,118,063

[45] Date of Patent: Sep. 12, 2000

[54] REDUCED-SIZE KEYBOARDS

[76] Inventor: David S. Steinbuhler, 901 North St., Titusville, Pa. 16354

[21] Appl. No.: 09/393,723

[22] Filed: Sep. 10, 1999

[51] Int. Cl.[7] .......... G01C 3/12

[52] U.S. Cl. .......... 84/423 R; 84/433

[58] Field of Search .......... 84/423 R, 429, 84/432, 433, 446, 447, 448

[56] References Cited

U.S. PATENT DOCUMENTS 442,166 12/1890 Boyes .......... 84/433
722,998 3/1903 Mahr .......... 84/425
3,756,113 9/1973 Suzuki et al. .......... 84/438
5,847,301 12/1998 Steinbuhler .......... 84/433

*Primary Examiner*—Bentsu Ro
*Assistant Examiner*—Shih-yung Hsieh
*Attorney, Agent, or Firm*—Reed Smith Shaw & McClay LLP

[57] ABSTRACT

In a reduced-size keyboard in a keyboard instrument, at least one apex of an angle in at least one key or bracing member is disposed at a different longitudinal position than any other apex in any key or bracing member.

18 Claims, 13 Drawing Sheets

REDUCED-SIZE KEYBOARDS

FIELD OF THE INVENTION

The present invention generally relates to pianos and their associated keyboards, particularly to reduced-size piano keyboards, as well as to piano keys.

BACKGROUND OF THE INVENTION

Known are pianos having a reduced size keyboard, such as discussed in U.S. Pat. No. 5,847,301 to Steinbuhler. Historically, a primary objective in connection with such keyboards has been to promote the comfort and ease of playing for those individuals for whom a conventionally sized keyboard presents challenges. Whereas, for example, such individuals might have difficulty in spreading the fingers of a single hand to such an extent as to play a "tenth" chord, or even an octave, on a conventionally sized keyboard, they might have little or no problem playing such chords on a reduced-size keyboard.

Recent developments in the piano industry have seen reductions in the length of an 88-key piano keyboard to approximately 38 inches (from the left edge of the lowermost A to the right edge of the uppermost C, as viewed when seated at a piano). A further reduction in this size is oft seen as a desirable objective, yet to date various impediments to achieving this goal have become apparent.

The aforementioned patent to Steinbuhler also relates to key bracing elements that may be used in connection with a reduced-size keyboard so as to strengthen, and provide greater support for, those extreme bass and treble keys that, in a reduced-size keyboard, are embodied by key shanks that are angled to such an extent as to invite the development of lateral moment arms that, absent such bracing members, would result in a highly inefficient transmission of force when the player plays such keys.

However, it has been recognized that such bracing members could well add bulk to such keys in such a way that the force required to play them is still somewhat increased. This may not necessarily be a problem with the extreme bass keys, as one is normally accustomed to the increased force in playing such keys in any event, but in the case of the extreme treble keys the additional force required might be seen as something of a nuisance.

SUMMARY OF THE INVENTION

The present invention thus broadly contemplates, in accordance with at least one presently preferred embodiment, such measures that would not only serve to return to the pianist a level of comfort, and opportunity for dexterity, normally associated with the extreme treble keys, and possibly even extreme bass keys, of a conventionally sized keyboard, but also to entertain the prospect of reducing the overall width of a reduced-size piano keyboard even further, possibly down to 36 inches. "Overall width" may be defined as that dimension corresponding to the dimension $S_2$ shown in FIG. 2.

In accordance with at least one presently preferred embodiment of the present invention, what is contemplated is a keyboard in which the key shanks of one or more of the extreme treble and/or bass keys is/are angled so that the bend of the angle is located more closely to the keyboard front rail than has hitherto been realized. However, the present invention contemplates, in broad fashion, that at least one key of the keyboard is configured such that at least one side of the key shank is angled so that the bend of the angle is located, with respect to the longitudinal direction of the keys, at a different point than the angle bend of at least one of: at least one longitudinal side of any other key on the keyboard or the opposite longitudinal side of the same key. The "longitudinal direction" corresponds to the longer dimension of typical playing ends of keys, which is typically perpendicular to the front rail and fall board of a keyboard instrument.

While it is recognized that the angle bend of at least one longitudinal side of one or more keys might be positioned in front of the fall board as a result, and thus be visible to the player, it is also recognized that the result is an outward appearance of such keys that could well strike the casual observer as aesthetically pleasing and distinct.

In accordance with another embodiment, it is contemplated that bracing elements be retained on some keys, such as at least one extreme bass key, and that these, within reason, bear no restrictions on the extent to which portions of them, may further encroach into a keyboard front rail. Particularly, the bracing member(s) in question may similarly be angled such that at least one side of an angle bend occurs closer to the front of the piano than has hitherto been the norm, with the result that an indentation could possibly be made in a conventional fall board to accommodate portions of the bracing member(s) so angled.

An attendant advantage that will be appreciated from the foregoing is that key shanks and/or bracing members, as a result, can be made thicker (i.e., wider) than has hitherto been the norm, thus resulting in greater stability and reliability of the key shank(s) and/or bracing member(s) in question.

Generally, at least one presently preferred embodiment of the present invention broadly contemplates, in a reduced-size keyboard instrument including a plurality of keys, the keys each comprising a playing end member and a key shank extending therefrom, each playing end member having a first longitudinal side and a second longitudinal side, each key shank having a first side extending from the first side of the playing end member and a second side extending from the second side of the playing end member, the first side of the key shank forming a first angle with respect to the first side of the playing end member and the second side of the key shank forming a second angle with respect to the second playing end member, the first angle having a first apex and the second angle having a second apex, the improvement comprising: at least one of the first and second apices in at least one of the keys being disposed at a different longitudinal position than any other of the first and second apices of in at least one of the keys.

Further, at least one presently preferred embodiment of the present invention broadly contemplates a keyboard instrument comprising: a plurality of keys; the keys each comprising a playing end member and a key shank extending therefrom; each playing end member having a first longitudinal side and a second longitudinal side, each key shank having a first side extending from the first side of the playing end member and a second side extending from the second side of the playing end member; the first side of the key shank forming a first angle with respect to the first side of the playing end member and the second side of the key shank forming a second angle with respect to the second playing end member; the first angle having a first apex and the second angle having a second apex; at least one of the first and second apices in at least one of the keys being disposed at a different longitudinal position than any other of the first and second apices of in at least one of the keys.

BRIEF DESCRIPTION OF THE DRAWINGS

The present invention and its presently preferred embodiments will be better understood by way of reference to the detailed disclosure herebelow and to the accompanying drawings, wherein.

DESCRIPTION OF THE PREFERRED EMBODIMENTS

FIGS. 1–6 illustrate, for background purposes, conventional keyboards and associated components.

Figure 1:
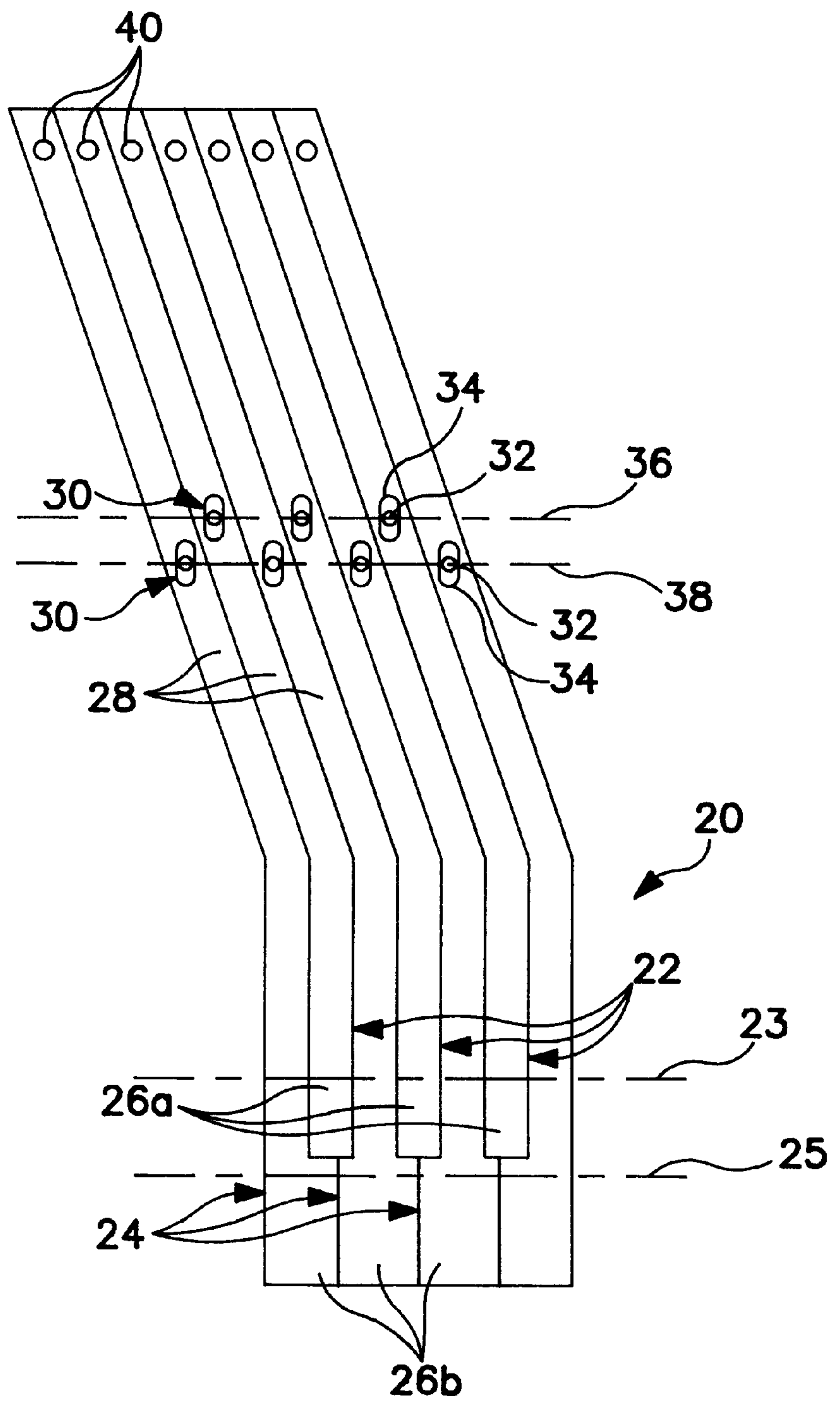
FIG. 1 is a plan view of a series of white and black keys of a conventional keyboard.
Figure 2:
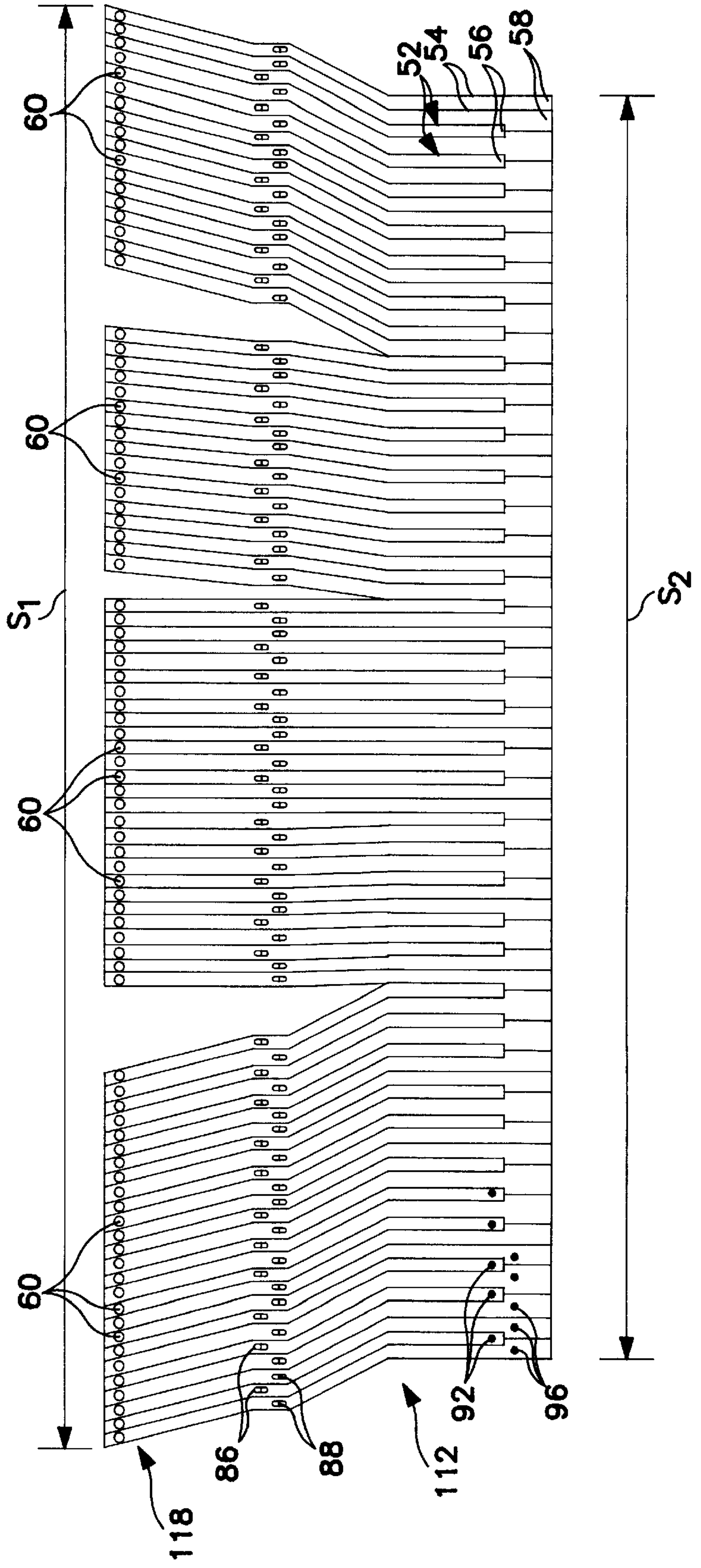
FIG. 2 is a plan view of a modified keyboard for an upright piano.

FIG. 1 illustrates a series 20 of keys comprising plural black keys 22 and plural white keys 24 shown in the conventional side-by-side array. Each of the keys 22, 24 comprises playing end portions 26*a*, 26*b*, respectively, and portions 28 extending rearwardly from the playing end portions 26*a*, 26*b*. The black keys 22 have a touch line 23 passing through the average area at which the black key 22 is touched in the first half of the black playing end portion 26*a*. The white keys 24 have a touch line 25 passing through the average area at which the white key 24 is touched in the first half of the white playing end portion 26*b*. The series 20 of keys is representative of the configuration of a number of the conventional eighty-eight keys. Each of the keys 22, 24 includes a pivot opening 30 provided in the portion 28. The pivot opening 30 includes a circular entrance opening 32 at the bottom of the portion 28 and large exit opening 34 at the top of the portion 28. Each of the pivot openings 30 is provided with bushing cloth (not illustrated) and receives a pivot pin. It will be noted that the entrance opening 32 of the black keys 22 line along a first balance point line 36 whereas the entrance openings 32 of the white keys 24 lie along a second balance point line 38 which spaced from and parallel with the first balance point line 36.

A capstan screw 40 is provided adjacent to the remote end of the portion 28. The capstan screw 40 is positioned to actuate the mechanism of the action rail that causes the hammer to strike the desired string (i.e., note).

Various conventional keyboards are illustrated in FIGS. 2–5, which illustrate modified keyboards 112, 114, 116 and 119 for an upright piano, a grand piano, a concert grand piano and a reduced keyboard piano, respectively. In each of the keyboards 112, 114, 116, 119, the opposite ends 118 of the keys 52, 54 have an overall width $S_1$ whereas the playing ends 56, 58 of all of the keys 52, 54 have an overall width $S_2$ of reduced size. That is, the dimension $S_1$ may equal about 50 inches while the dimension $S_2$ may equal about 42 inches. In each of the modified keyboards 112, 114, 116, 119, the capstan screws 60 are spaced-apart to match the overall spacing of the mechanisms of an action rail of the corresponding piano.

Figure 3:
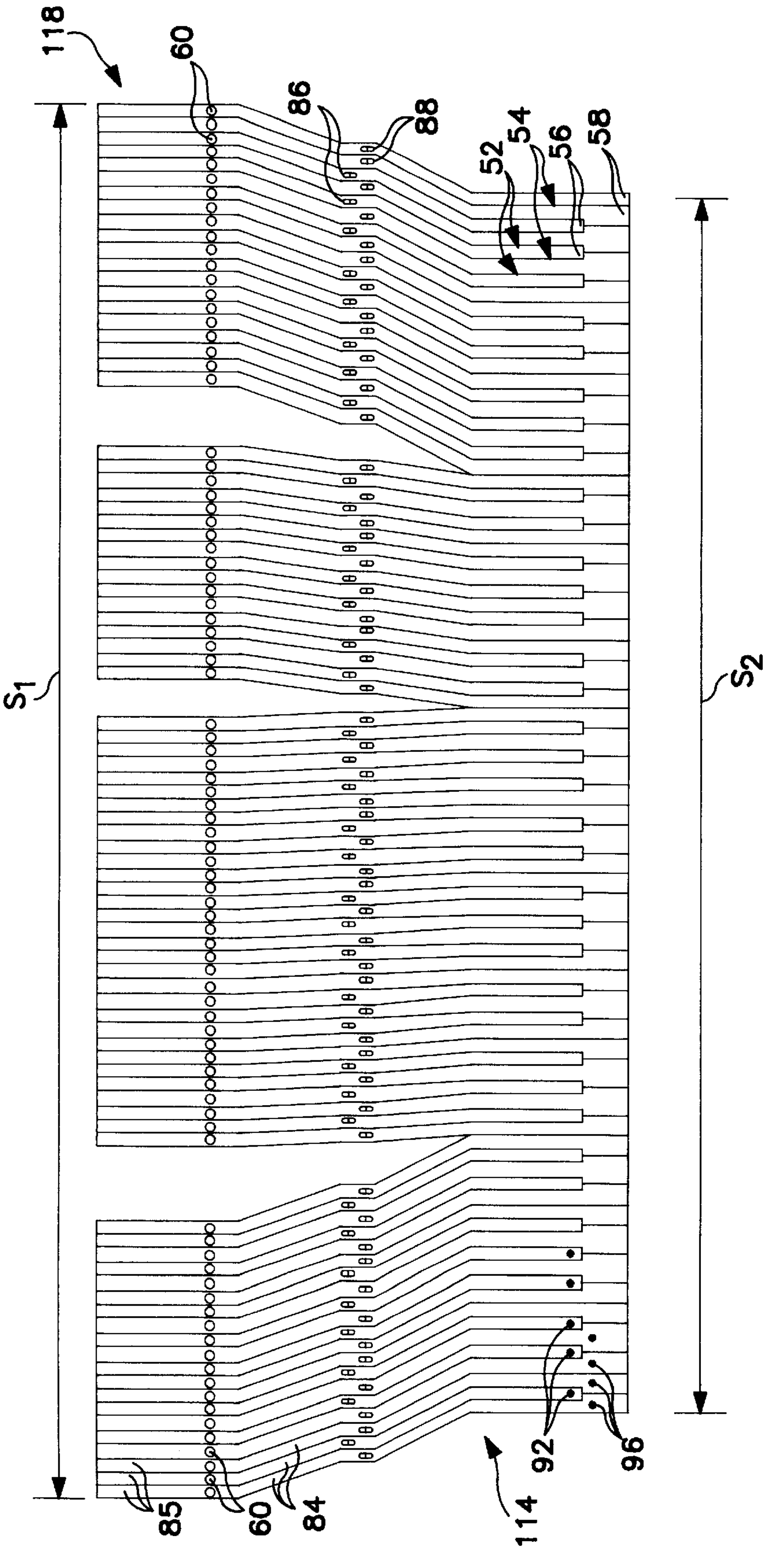
FIG. 3 is a plan view of a modified keyboard according for a grand piano.
Figure 4:
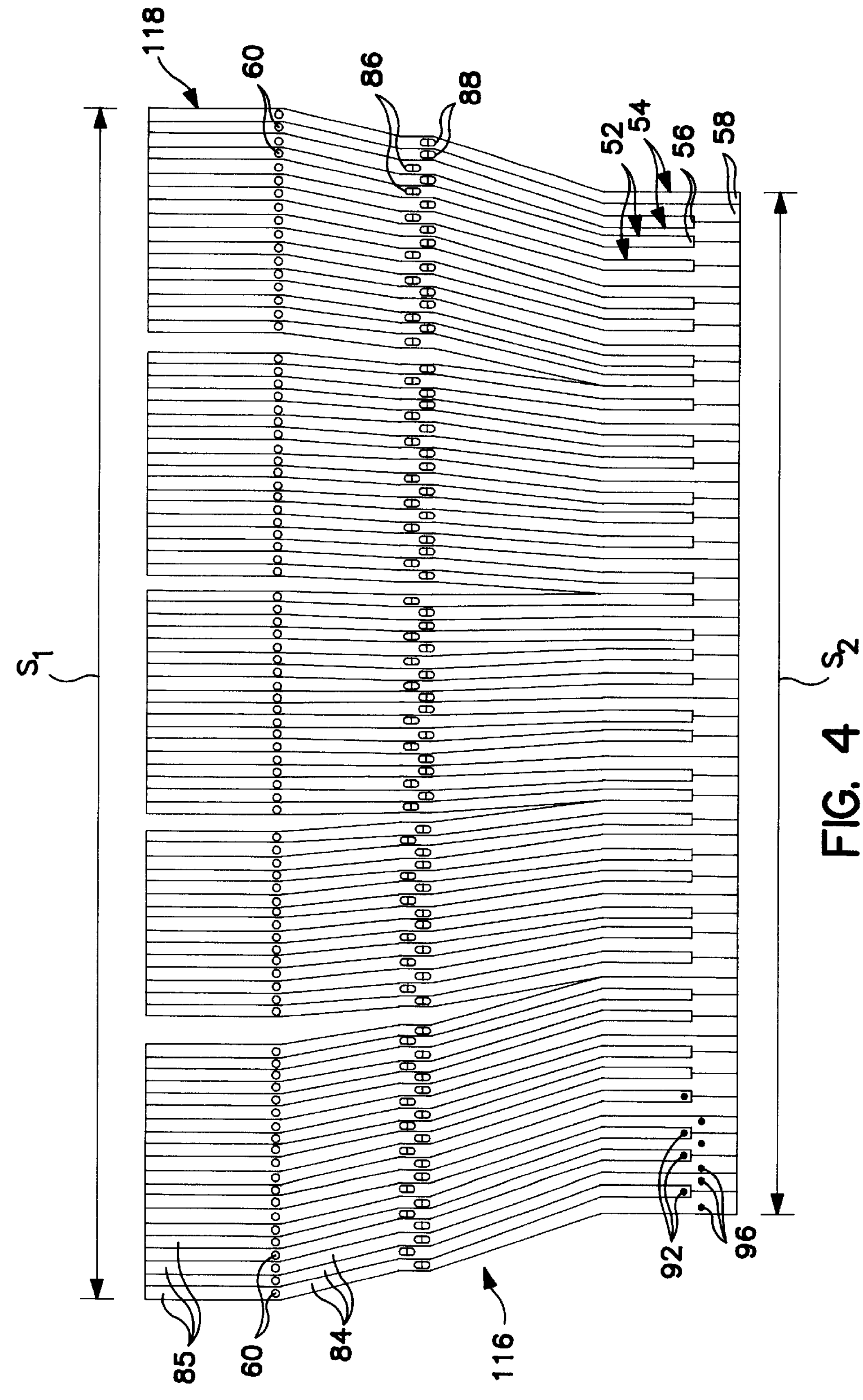
FIG. 4 is a plan view of a modified keyboard for a concert grand piano.
Figure 5:
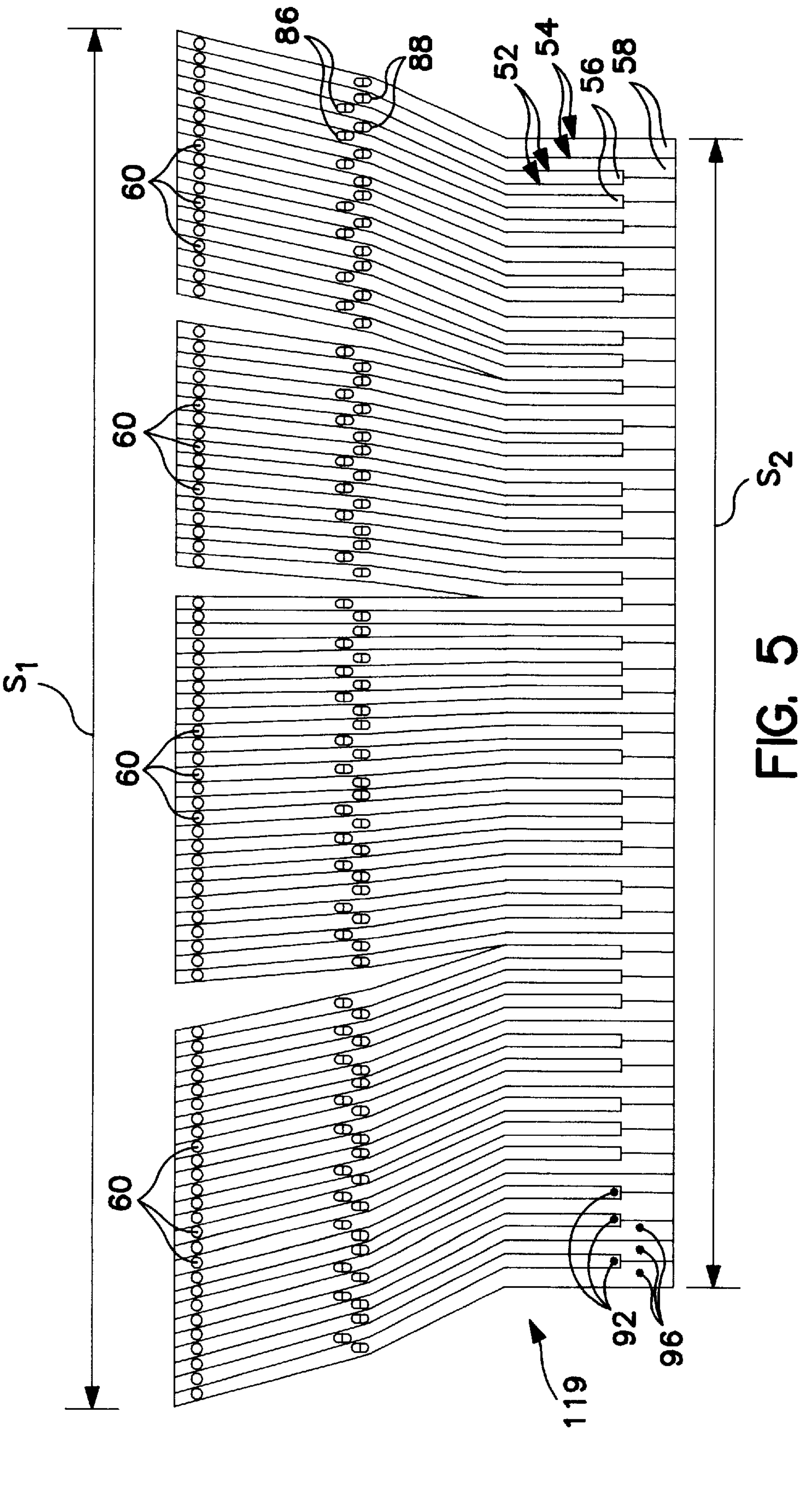
FIG. 5 is a plan view of a reduced keyboard.

It will be observed in FIGS. 3 and 4, that certain of the keys have an opposite end portion 85 extending from the second portion 84. The opposite end portion 85 is used in the grand piano 136 (FIG. 7) to lift the damper head 146. The opposite end portion 85 of the concert grand keyboard 116 (FIG. 4) is used for a similar purpose.

Figure 6:
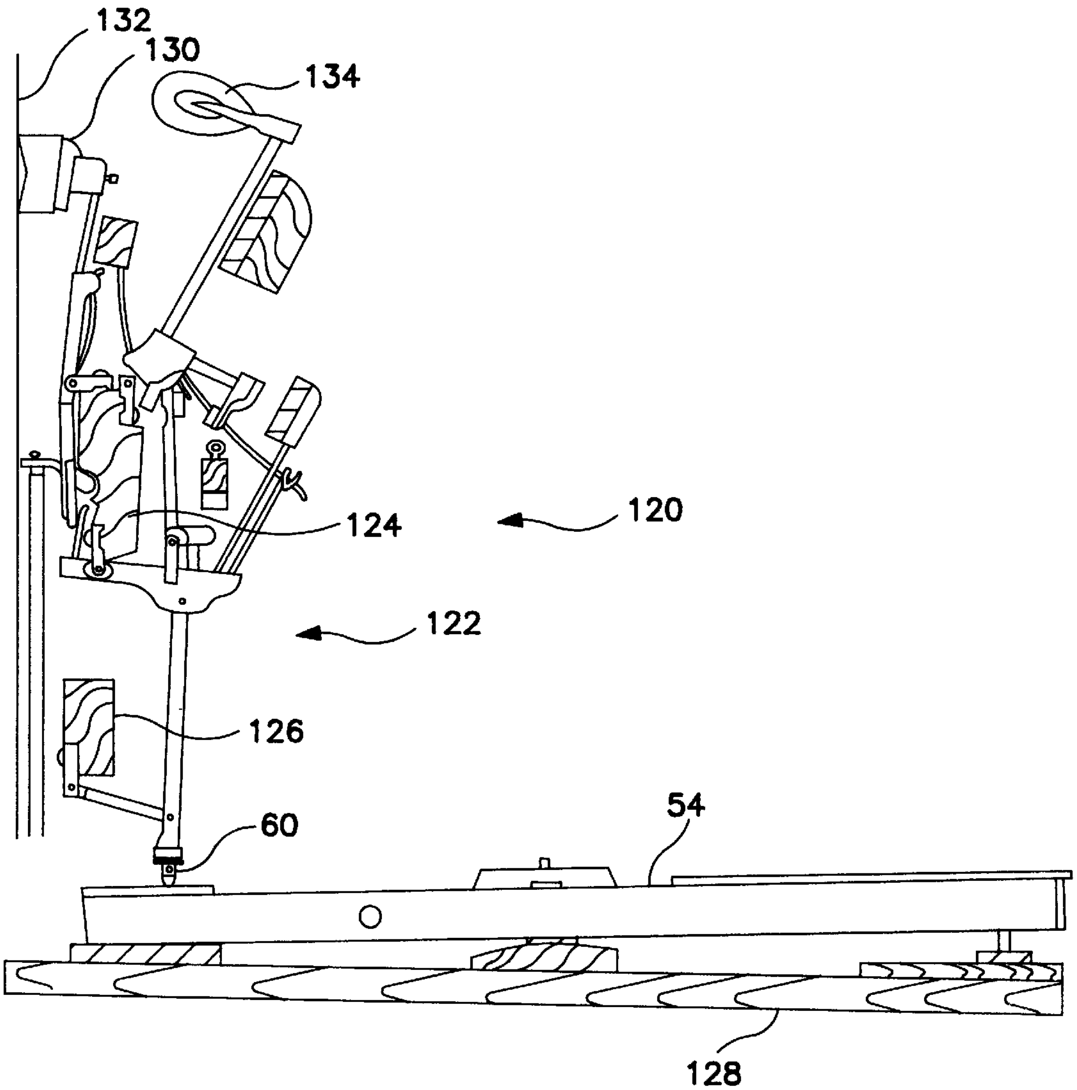
FIG. 6 is a transverse cross-sectional view illustrating the key, a string and the mechanism of an upright piano.

Referring to FIG. 6, there is illustrated a transverse cross-sectional view of an upright piano 120. The piano 120 includes an action 122 including a main action rail 124 and a lower action rail 126 having legs or brackets (not shown) which support the action 122 on the key frame 128. When the key 54 is pressed, the capstan screw 60 elevates the action 122 causing the damper head 130 to disengage from the string 132 and the hammer 134 to strike the string 132.

Figure 7:
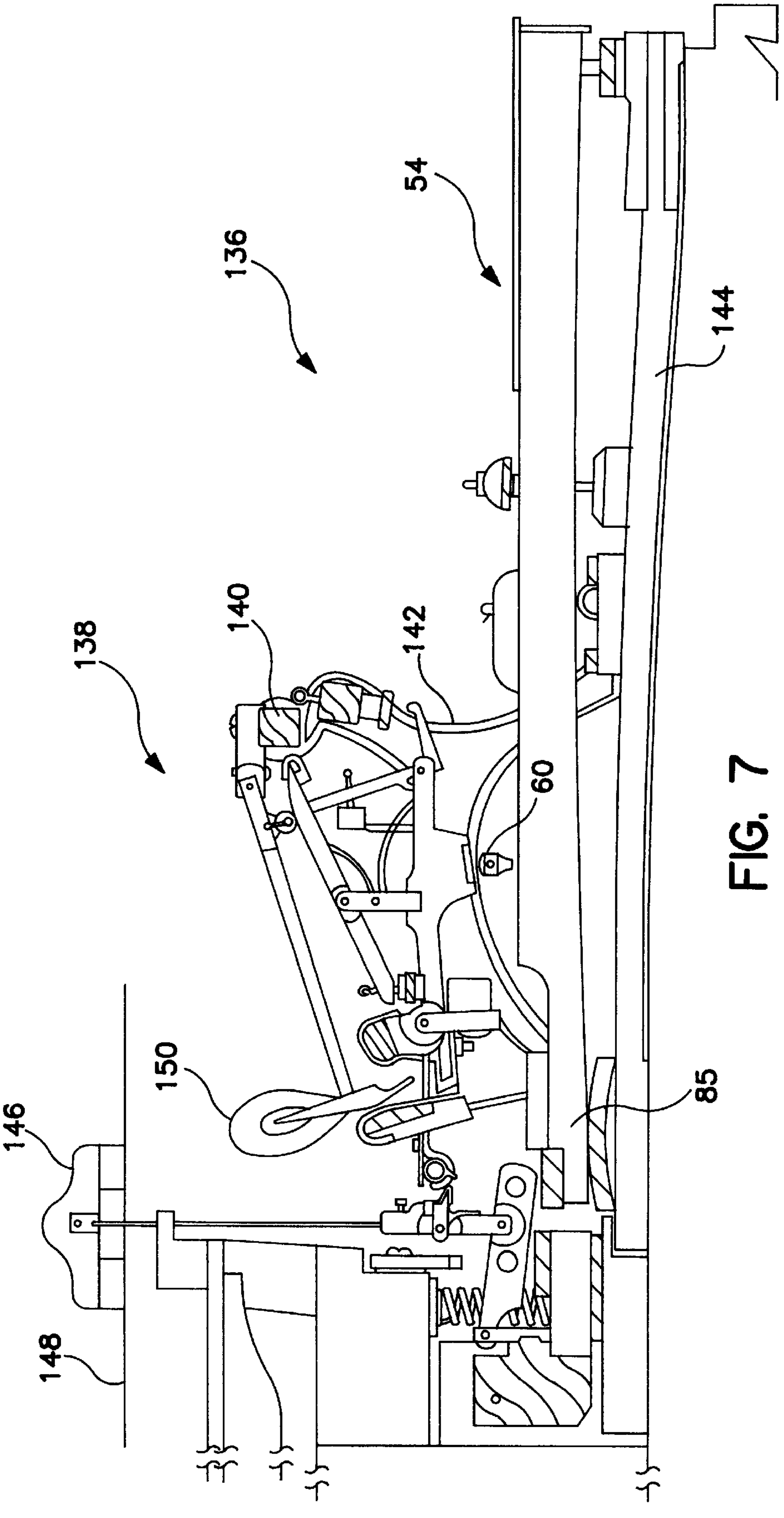
FIG. 7 is a transverse cross-sectional view illustrating the key, a string and the mechanism of a grand piano.

Referring to FIG. 7, there is illustrated a transverse cross-sectional view of a grand piano 136. The grand piano 136 includes an action 138 having a main action rail 140 having legs or brackets 142 which support the action 138 on the key frame 144. When the key 54 is pressed, the capstan screw 60 elevates the action 138 causing the damper head 146 to disengage from the string 148 and causing the hammer 150 to strike the string 148.

The disclosure now turns to a discussion, with relation to FIGS. 8–15*a*, of conventional bracing members that may be utilized for keyboard keys. A more detailed discussion of such bracing members may be found in U.S. Pat. No. 5,847,301 to Steinbuhler, which is fully incorporated herein by reference.

Figure 8:
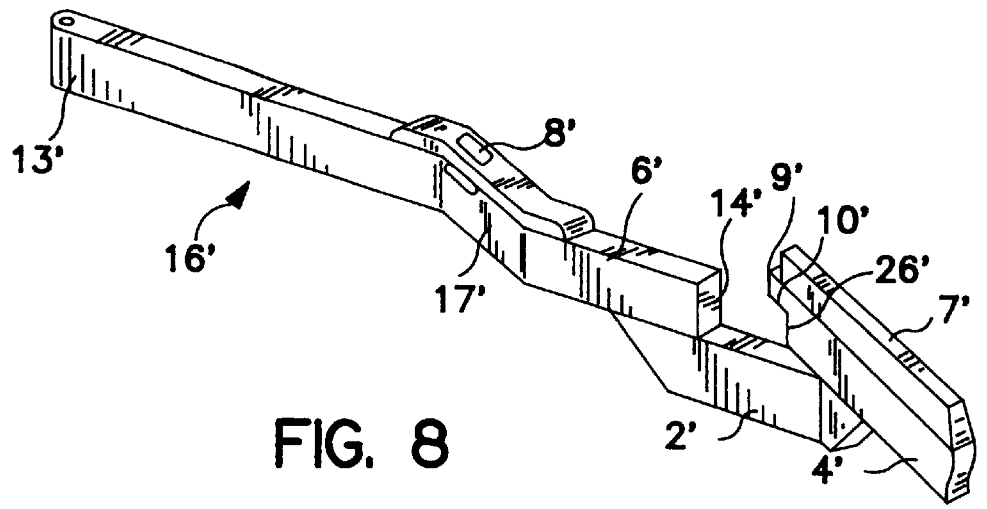
FIG. 8 is a top perspective view of a piano key.

As depicted in FIG. 8, a braced key can generally comprise a playing end member 4', a key shank 16' and a bracing member 2'. The playing end member 4' is the portion of the key touched by the player during the playing of the keyboard. The key shank 16' encompasses the rear of the key and includes a key shank front portion 6'; a middle portion 17'; which contains a pivot opening 8'; and a tail portion 13' that connects to elements that engage the piano's capstan mechanism.

Figure 9:
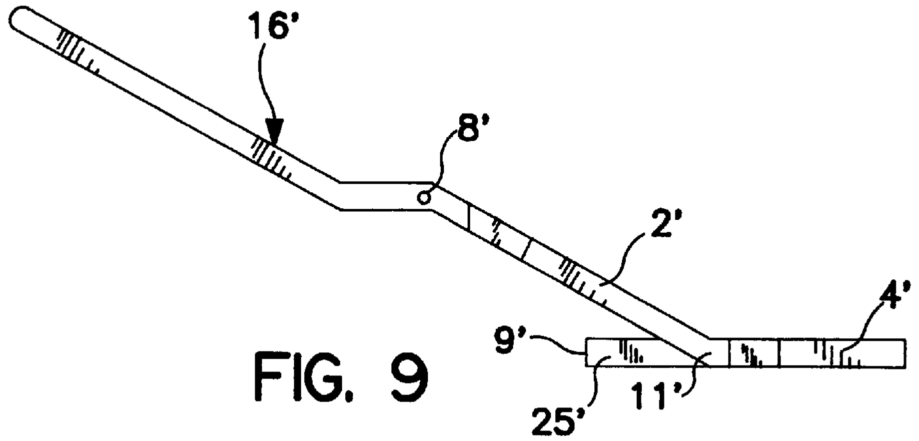
FIG. 9 is a bottom view of the key of FIG. 8.
Figure 10:
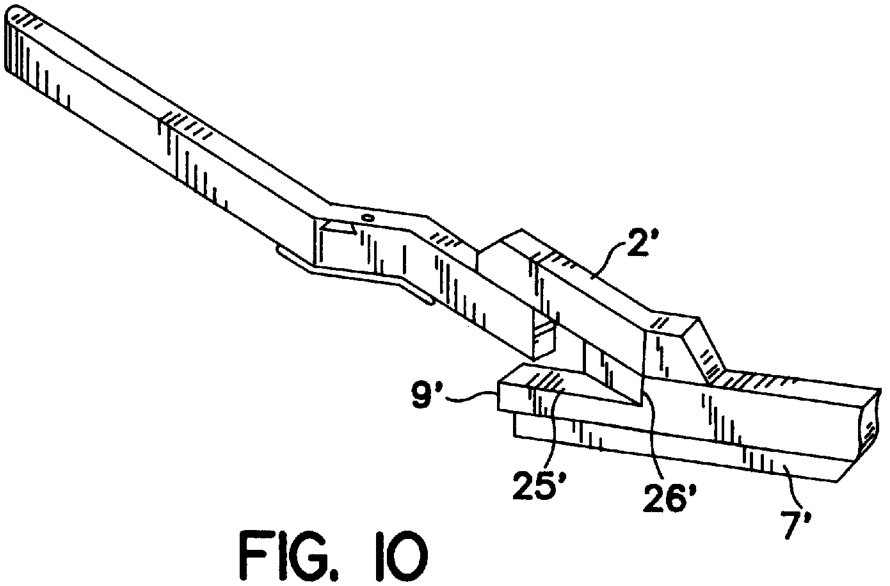
FIG. 10 is a bottom perspective view of the key of FIG. 8.
Figure 12:
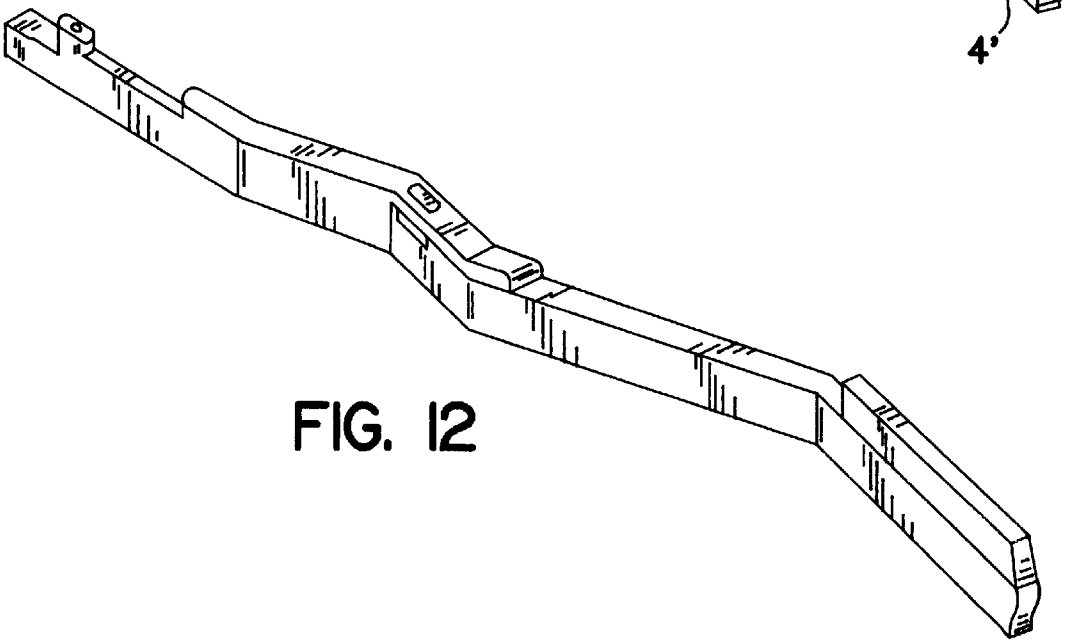
FIG. 12 is a perspective view of another conventional key.

In contradistinction to an unbraced key (as depicted in FIG. 12), the key depicted in FIG. 8 has a bracing member 2' disposed below the playing end member 4' and key shank 16'. As installed in a piano keyboard, the bracing member 2' sits in a space above the keyboard bed and between the rails (not shown) underlying the playing end of the keys and the pivot opening of the keys. One end of the bracing member 2' is connected along the bottom surface of the key shank's front portion 6'. The other end of the bracing member is connected to the playing end member 4' along the bottom surface of the playing end member and inwards from the rear end 9' of the playing end member. Preferably the bracing member should be mounted from the rear end 9' of the playing end member approximately one fourth to one half of the length of the playing end member. By mounting the bracing member 2' inwards from the end of the playing end member the moment arm between the centerline of the playing end member and the pivot opening 8' is reduced, thereby improving the torsional rigidity of the key. To increase the mounting contact area, and thereby increase the stiffness of the key, the bracing member can have a curved end 11' connected to and extending along the bottom surface of the playing end member, as shown in FIG. 9. Curving the end of the bracing member also permits the playing end member to be mounted on the bracing member at an angle relative to the front portion of the key shank.

Figure 13:
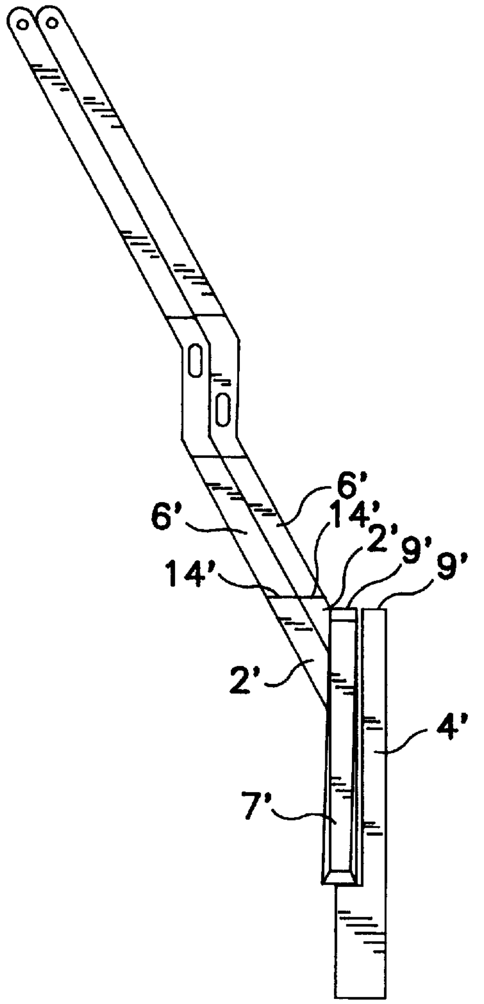
FIG. 13 is a top view of a whole note key and half note key as the keys would be mounted in a keyboard.

In order to permit the stiffened keys to be operably mounted adjacent to each other clearance must be provided such that the depression of one key does not impact an adjacent key (see FIG. 13). This clearance can be achieved by removing a section of the rear bottom portion of the playing end member 25' to a depth 26' sufficient to permit the key to be depressed without having the rear bottom portion of the playing end member 25' contact the adjacent key (see FIG. 10). Clearance between the rear end 9' of the playing member 4' and the front portion 14' of the key shank 6' of an adjacent key should also be provided (see FIG. 13).

Figure 11:
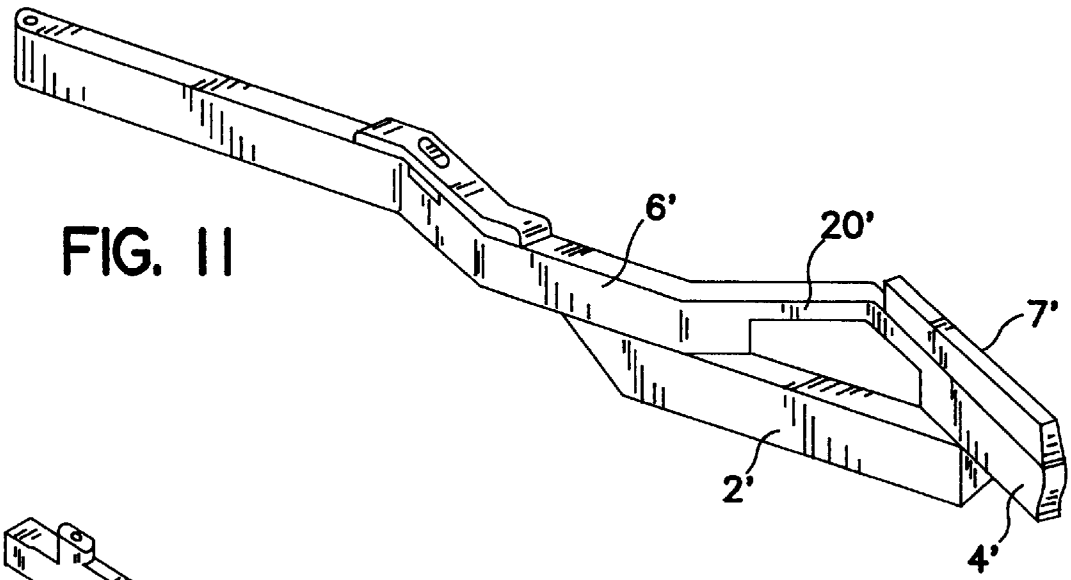
FIG. 11 is a perspective view of a second realization of a key.
Figure 14:
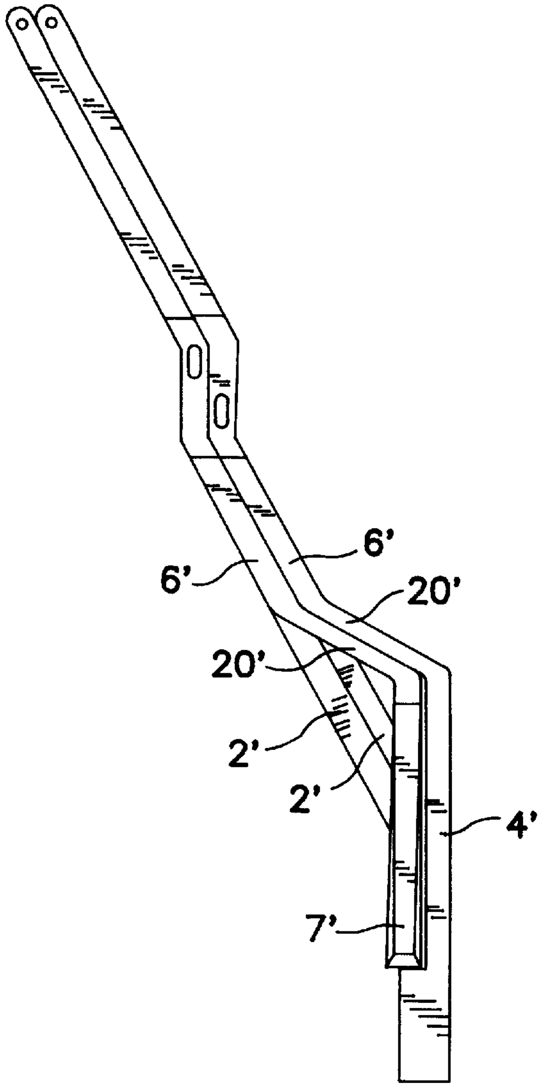
FIG. 14 is a top view of a whole note key and half note key in another realization as the keys would be mounted in a keyboard.

The playing end member 4' can be discontinuous from the key shank front portion 6' and only indirectly connected to the key shank through the bracing member 2'. In an alternative realization, as shown in FIGS. 11 and 14, the front portion of the key shank 6' is connected to the playing end member 4' through a thin connecting member 20' continuous with both the key shank 16' and the playing end member 4'. In this embodiment, clearance must also be provided such that depression of the piano key will not result in the bottom portion of the connecting member 20', contacting the top surface of the bracing member of an adjacent key. This clearance is preferably achieved by restricting the vertical thickness of the connecting member 20'.

Figure 15:
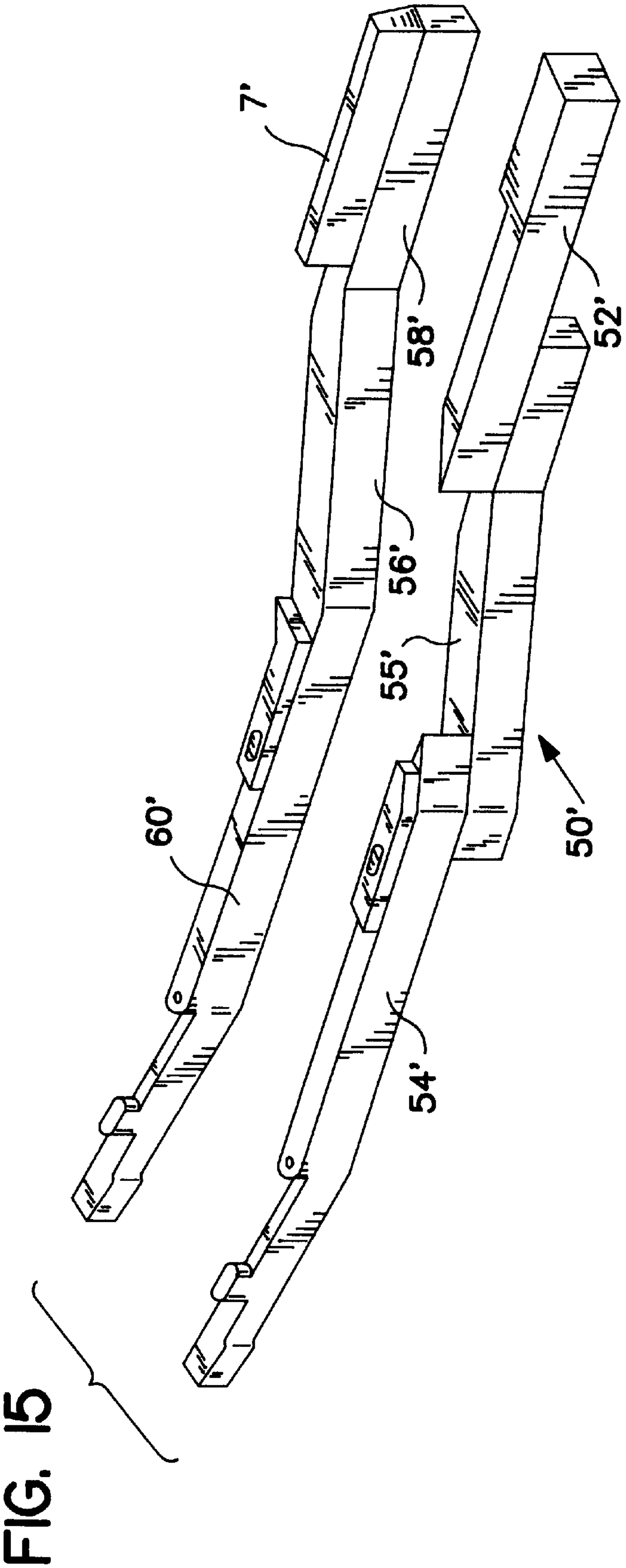
FIG. 15 is a perspective view of a further realization of a key.
Figure 15A:
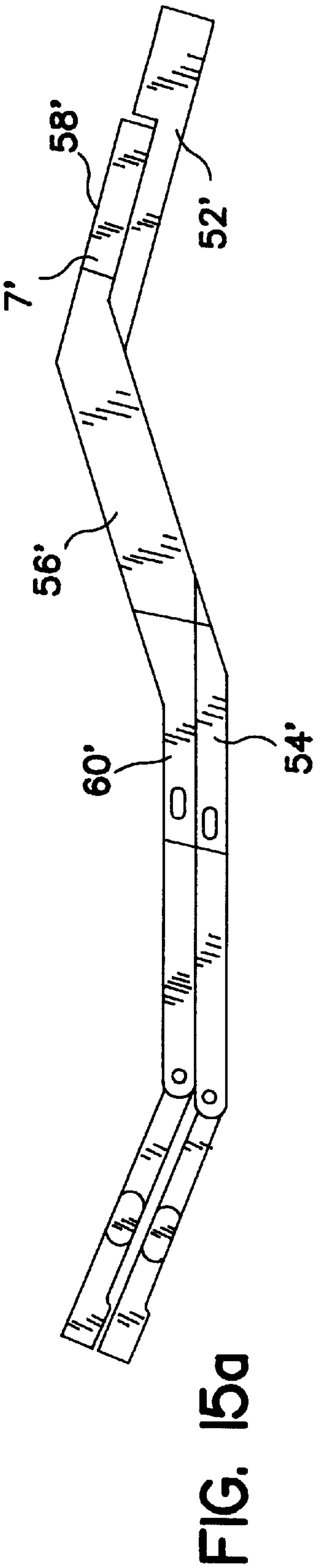
FIG. 15*a* is a top view of the key of FIG. 15.

As shown in FIGS. 15 and 15*a*, as another alternative, a first and second key are combined to make a key unit. The first key comprises a playing end member 52', a bracing member 50' and a key shank 54'. The playing end member 52' and the key shank 54' are mounted on top of the ends of the bracing member 50'. The bracing member 50' has a center portion 55' of a width greater than the width of the key shank 54', to impart greater stiffness to the first key. The second key comprises a playing end member 58', a center portion 56' and a key shank 60'. The width of the center portion 56' is substantially the same as the width of the center portion 55' of the first key bracing member 50' and greater than the width of key shank 60', to impart greater stiffness to the second key. The center portion of the second key 56' is disposed on top of and aligned with the center portion 55' of the bracing member 50' of the first key (see FIG. 15*a*). Sufficient clearance between the bottom surface of the center portion 56' of the second key and the top of the center portion 55' of the bracing member must exist such that the operation of the second key will not interfere with the first key. Clearance may be obtained by tapering the top surface of the bracing member along the portion of the bracing member that underlies the center portion of the second key. Alternatively, a section of the bottom surface of the center portion of the second key can be removed, or a combination of tapering the bracing member of the first key and removing some of the center portion from the bottom surface of the second key can be used.

It is contemplated that the key shank, bracing member and playing end member components may be formed from wood, plastic or any other material found suitable to form piano keys. It is further contemplated that the bracing member can be secured to the front portion of the key shank and the playing end member by generally known glues or adhesive materials and/or mechanical fastening devices. Alternatively, the bracing member could be integrally formed with the playing end portion and key shank should the key be manufactured by injection molding or other similar processes.

As shown and described above, a key for musical keyboard instruments can have a stronger structural stiffness and greater torsional rigidity than some other types of keys.

Figure 16:
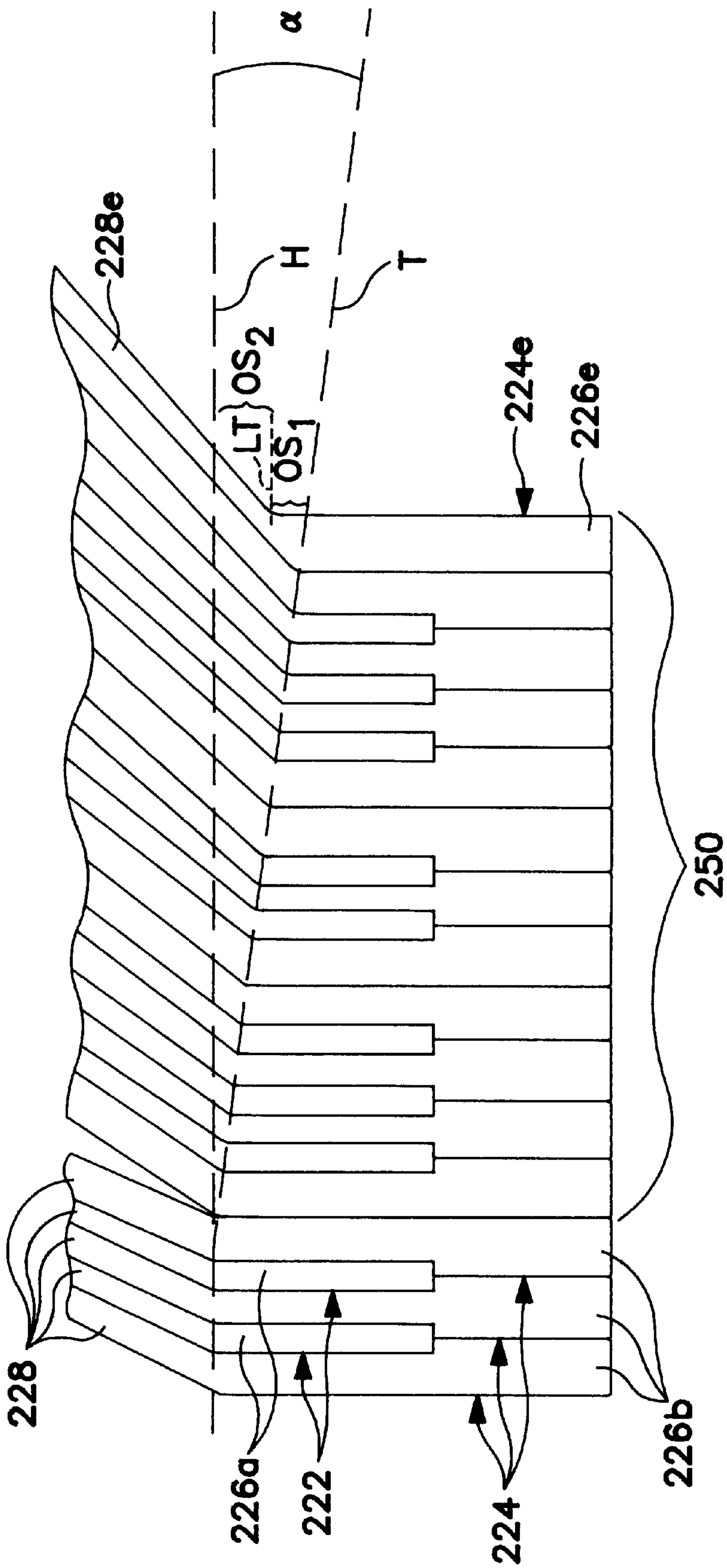
FIG. 16 illustrates an upper view of some extreme treble keys of a reduced-size keyboard in accordance with an embodiment of the present invention.
Figure 17:
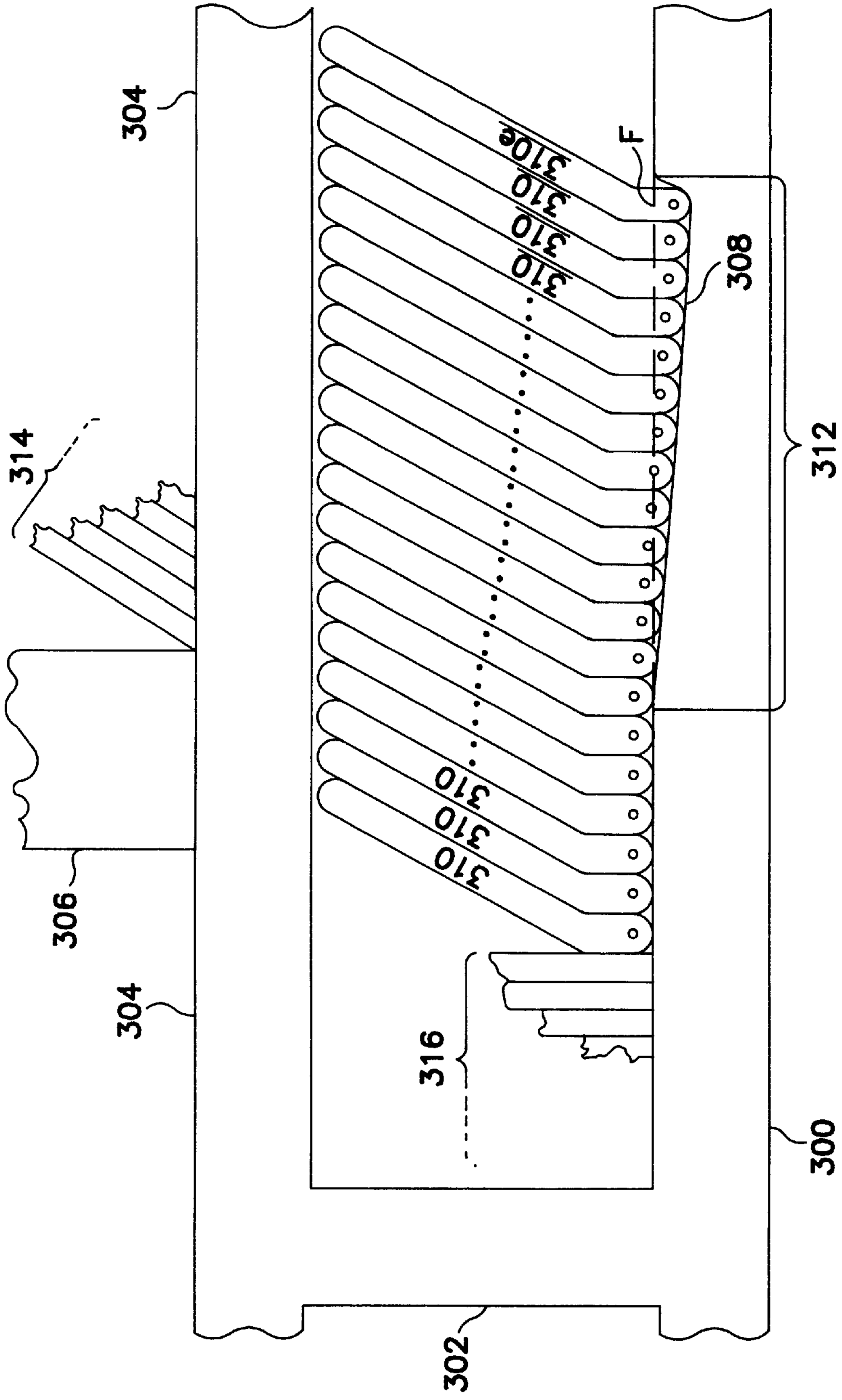
FIG. 17 illustrates a bottom view of some extreme bass keys of a reduced-size keyboard in accordance with an embodiment of the present invention.

The disclosure now turns to a discussion of at least one presently preferred embodiment of the present invention, as shown in FIGS. 16 and 17.

FIG. 16 illustrates the extreme treble keys (black 222 and white 224) of a reduced-size keyboard in accordance with an embodiment of the present invention. Black and white keys 222, 224 each have playing ends 226*a* and 226*b*, respectively, as well as key shanks 228 extending therefrom. The general function of playing ends and shanks of keys, and the manner in which they are typically mounted on a keyboard instrument, can be appreciated from the disclosure relating to FIGS. 1–15*a*.

Only some of the keys bear reference numerals, but it is to be understood that the present discussion is intended to refer to most of the illustrated keys. The exception is the end key 224*e*, corresponding to C at 4 octaves above middle C, having a playing end portion 226*e* and shank 228*e*.

Dotted line H is an imaginary horizontal line that is common to those points on each key (regardless of whether it is black 222 or white 224) at which, conventionally, the corresponding key shank 228 would technically begin and, thus, often turn or angle with respect to the corresponding playing end member 226*a*/*b*. (It should be understood that in a conventional keyboard instrument, that is, one that does not have a reduced-size keyboard, there essentially is no turn or angle while in a reduced-size keyboard it is even possible for one or more keys to technically encompass no turning angle and thus involve a "straight" key shank with respect to the playing end member. However, for the purposes of the present discussion, it will be assumed that the term "turn" refers to essentially any orientation of a key shank with respect to a key playing end member, including a "straight" orientation—the idea being that a "straight" orientation involves a "turn" of zero degrees with respect to the longitudinal direction of the key.) In accordance with a presently preferred embodiment of the present invention, however, a given set of the extreme treble keys (indicated here collectively at 250) may be configured such that this is not the case.

As shown, those keys 222/224 that form part of set 250 may depart significantly from the norm in that the turn, bend or angle between a key shank (228) and playing end (226*a*/*b*) may occur closer to the front of the keyboard instrument (e.g., towards the front rail of a piano) than has hitherto been the norm.

In accordance with the illustrated embodiment, an imaginary line common to the points along such keys where the turn, bend or angle occurs is indicated at T. In the illustrated case, T is a straight line that deviates from line H by a given angle $\alpha$. As shown, the first key bearing this modification may be the F that is beyond two octave above middle C. As shown, the last key 224*e* of the keyboard may be configured such that, at its left side, the point at which the left side of playing end 226*e* technically turns into key shank 228*e* coincides with line T, while the point at which the right side of playing end 226*e* technically turns into shank 228*e* (depicted as a horizontal line LT) is offset from line T by a distance $OS_1$ and from line H by a distance $OS_2$.

Although the embodiment of FIG. 16 has been described with reference to utilizing an imaginary line T to define the points at which a playing end member of a key turns into a key shank, it is to be understood that other determining factors may be used for this purpose. For instance, it is possible for the “turning points” to lie along a curve or other non-linear representation of common points.

Insofar as the keys 222/224 in set 250 have playing end members that transition into key shanks at points closer to the front rail of the keyboard than has conventionally been the case, it will be appreciated that the ivory or ebony material disposed on each key will, for conventional aesthetic purposes, need to cover each key sufficiently so that the portions of each key 222/224 outside of the “fall board” (not shown) will be covered. This raises the interesting possibility that, in front of the fall board, not all keys will have the characteristic straight orientation and thus, in fact, may bend before receding under the fall board. It has been determined that not only will this not compromise the practical functionability of the keys in question, but it may also lend a unique, albeit unconventional, aesthetic appearance that may be visually stimulating. Thus, whether the lay of the fall board coincides with the imaginary line H in FIG. 16 or with another imaginary line parallel thereto, it should be understood that the present invention, in accordance with at least one presently preferred embodiment, does not preclude the possibility of effecting transitions between a playing end member and a key shank in front of a fall board.

It should be appreciated that one of the attendant advantages of effecting transitions between playing end members of keys and key shanks in the manner illustrated in FIG. 16, or in any functionally similar manner, is that it is possible to effect reduced angles between the key shanks and playing end members while still providing an admirably reduced-size keyboard. Otherwise, if the transition points between the playing end members and the key shanks were restricted to the line H, it would not be possible to effect such reduced angles between the key shanks and playing end members.

If one were to choose to transition between the key shanks and playing end members along line H, it will be appreciated that, in such a case, additional bracing members may be required on the keys in order to provide them with sufficient strength and stability. By adopting the principles according to at least one presently preferred embodiment of the present invention, however, it is possible to attain functionable angles between key shanks and playing end members and thus result in greater strength for the keys so that bracing members may not even be necessary.

It should be understood that the characteristics described heretofore with regard to the treble keys in FIG. 16 can equally be applied to extreme bass keys. In both instances, the inventive “earlier” occurrences of the transitions between playing end members and key shanks will result in key shanks of thicknesses that lend themselves well to stability and durability of the keys in question. For this reason, it may be possible to eliminate bracing members both at the extreme treble and extreme bass keys. However, in those instances where bracing members may be retained (for example, at the extreme bass keys), FIG. 17 illustrates a principle similar to that shown in FIG. 16, but for the bracing members. In this case, the view is from underneath a reduced-size piano.

As shown in FIG. 17, the piano includes a front rail 300, crosspiece 302, midrail 304 and additional support member 306. Front rail 300 has an indentation 308 as discussed below, while imaginary line F represents the conventional rear edge of a front rail throughout the indentation 308.

In a typical reduced-size piano keyboard, it is possible to include bracing members 310 and 310*e* on extreme bass keys. This is shown in FIG. 17. A detailed discussion of the nature and function of typical bracing members is provided herein with relation to FIGS. 8–15*a* as well as in U.S. Pat. No. 5,847,301 to Steinbuhler. Indicated at 314 and 316 are unbraced portions of various bass keys.

As shown in FIG. 17, the present invention broadly contemplates angling certain bracing members 310/310*e* at points further away from the front of the piano than has hitherto been the norm. Analogously with respect to the treble-key configuration shown in FIG. 16, here it is desirable that the bracing members of the lowermost keys (i.e., the most extreme bass keys) have their bend points closer to line F than those of keys further up the keyboard.

Again, the specific algorithm chosen for determining the bend points of the various bracing members 310/310*e*, may be chosen in essentially any manner deemed suitable for imparting appreciable thickness to the bracing members in question while still maintaining an appreciably small overall keyboard size.

Analogously with respect to the uppermost key 224*e* of FIG. 16, bracing member 310*e* corresponds to the lowest note on the keyboard (typically the A that is beyond three octaves below middle C) and may have dual bending points, the left one of which (with respect to the drawing) is closer to the line F and the right one of which is further away.

To appreciate the potential impact of the measures discussed herein, it has been found that an 88-key keyboard constructed in accordance with the principles described in conjunction with FIGS. 16 and/or 17 can have an overall width (i.e., corresponding to the combined width of the playing ends of all keys) of about 36 inches.

It should be appreciated that the present invention broadly contemplates, in accordance with at least one presently preferred embodiment, that at least one apex of an angle in at least one key in a keyboard instrument is disposed at a different longitudinal position than any other apex in any key in the keyboard instrument. In this context, “apex” refers to the point at which one side of a key playing end member bends or angles with respect to the corresponding side of the corresponding key shank. The apex could conceivably be a sharp point of an angle or it could be the midpoint of a curved transition between the aforementioned sides of the playing end member and key shank. It will thus be appreciated that, for each key, there will be two such apices, one at the left longitudinal side of the key and one at the right longitudinal side. “Longitudinal position” refers to the relative position along the longitudinal direction of the keys (i.e., the direction perpendicular to the run of the fall board and/or front rail) at which each apex is located. For example, the line H in FIG. 16 represents a common longitudinal position for each of the apices located along that line.

The present invention also broadly contemplates, in accordance with at least one presently preferred embodiment, that at least one apex of an angle in at least one bracing member in a keyboard instrument is disposed at a different longitudinal position than any other apex in any bracing member in the keyboard instrument.

If not otherwise stated herein, it may be assumed that all components and/or processes described heretofore may, if appropriate, be considered to be interchangeable with similar components and/or processes disclosed elsewhere in the specification, unless an express indication is made to the contrary.

If not otherwise stated herein, any and all patents, patent publications, articles and other printed publications discussed or mentioned herein are hereby incorporated by reference as if set forth in their entirety herein.

It should be appreciated that the apparatus and method of the present invention may be configured and conducted as appropriate for any context at hand. The embodiments described above are to be considered in all respects only as illustrative and not restrictive. The scope of the invention is defined by the following claims rather than the foregoing description. All changes which come within the meaning and range of equivalency of the claims are to be embraced within their scope.

What is claimed is:

1. In a reduced-size keyboard instrument including a plurality of keys, said keys each comprising a playing end member and a key shank extending therefrom, each said playing end member having a first longitudinal side and a second longitudinal side, each said key shank having a first side extending from said first side of said playing end member and a second side extending from said second side of said playing end member, said first side of said key shank forming a first angle with respect to said first side of said playing end member and said second side of said key shank forming a second angle with respect to said second playing end member, said first angle having a first apex and said second angle having a second apex, the improvement comprising:

at least one of said first and second apices in at least one of said keys being disposed at a different longitudinal position than at least one other apex in at least one of said keys.

2. The improvement according to claim 1, wherein both apices in at least one key are disposed at different longitudinal positions with respect to one another.

3. The improvement according to claim 1, wherein:

said keyboard instrument further comprises a front rail;

the longitudinal position of each apex in each key is defined as a distance with respect to said front rail;

among a first plurality of keys, the average longitudinal position of the first and second apices of each key is substantially the same; and among said second plurality of keys, the average longitudinal position of the first and second apices of each key is less than in said first plurality of keys.

4. The improvement according to claim 3, wherein said second plurality of keys correspond to at least one of:

higher pitches than said first plurality of keys; and lower pitches than said first plurality of keys.

5. The improvement according to claim 4, wherein said second plurality of keys are contiguous.

6. The improvement according to claim 4, wherein said second plurality of keys correspond solely to lower pitches than said first plurality of keys.

7. The improvement according to claim 6, wherein, among said second plurality of keys, the average longitudinal position of the first and second apices of each key decreases in correspondence with keys that correspond to lower pitch.

8. The improvement according to claim 4, wherein said second plurality of keys correspond solely to higher pitches than said first plurality of keys.

9. The improvement according to claim 8, wherein, among said second plurality of keys, the average longitudinal position of the first and second apices of each key decreases in correspondence with keys that correspond to higher pitch.

10. A keyboard instrument comprising:

a plurality of keys;

said keys each comprising a playing end member and a key shank extending therefrom;

each said playing end member having a first longitudinal side and a second longitudinal side, each said key shank having a first side extending from said first side of said playing end member and a second side extending from said second side of said playing end member;

said first side of said key shank forming a first angle with respect to said first side of said playing end member and said second side of said key shank forming a second angle with respect to said second playing end member;

said first angle having a first apex and said second angle having a second apex;

at least one of said first and second apices in at least one of said keys being disposed at a different longitudinal position than at least one other apex in at least one of said keys.

11. The keyboard instrument according to claim 10, wherein both apices in at least one key are disposed at different longitudinal positions with respect to one another.

12. The keyboard instrument according to claim 10, wherein:

said keyboard instrument further comprises a front rail;

the longitudinal position of each apex in each key is defined as a distance with respect to said front rail;

among a first plurality of keys, the average longitudinal position of the first and second apices of each key is substantially the same; and among said second plurality of keys, the average longitudinal position of the first and second apices of each key is less than in said first plurality of keys.

13. The keyboard instrument according to claim 12, wherein said second plurality of keys correspond to at least one of:

higher pitches than said first plurality of keys; and lower pitches than said first plurality of keys.

14. The keyboard instrument according to claim 13, wherein said second plurality of keys are contiguous.

15. The keyboard instrument according to claim 13, wherein said second plurality of keys correspond solely to lower pitches than said first plurality of keys.

16. The keyboard instrument according to claim 15, wherein, among said second plurality of keys, the average longitudinal position of the first and second apices of each key decreases in correspondence with keys that correspond to lower pitch.

17. The keyboard instrument according to claim 13, wherein said second plurality of keys correspond solely to higher pitches than said first plurality of keys.

18. The keyboard instrument according to claim 17, wherein, among said second plurality of keys, the average longitudinal position of the first and second apices of each key decreases in correspondence with keys that correspond to higher pitch.

* * * * *